United States Patent [19]

Brautigam

[11] Patent Number: 5,124,039
[45] Date of Patent: Jun. 23, 1992

[54] PROCESS FOR BIOLOGICAL TREATMENT OF DISSOLVED NITRATES

[75] Inventor: Hans-Jurgen Brautigam, Hamburg, Fed. Rep. of Germany

[73] Assignee: Degremont, Rueil Malmaison, France

[21] Appl. No.: 514,307

[22] Filed: Apr. 25, 1990

[30] Foreign Application Priority Data

May 29, 1989 [DE] Fed. Rep. of Germany ....... 3917368

[51] Int. Cl.$^5$ .............................................. C02F 3/30
[52] U.S. Cl. .................................... 210/610; 210/630; 210/903
[58] Field of Search ............... 210/603, 605, 610, 611, 210/620, 624, 630, 631, 903

[56] References Cited

U.S. PATENT DOCUMENTS

| | | | |
|---|---|---|---|
| 3,709,364 | 1/1973 | Savage | 210/903 X |
| 4,039,438 | 8/1977 | Anderson | 210/610 |
| 4,384,956 | 5/1983 | Mulder | 210/603 |
| 4,756,831 | 7/1988 | Menzel et al. | 210/605 |

FOREIGN PATENT DOCUMENTS

| | | | |
|---|---|---|---|
| 3121395 | 12/1982 | Fed. Rep. of Germany | 210/610 |
| 3741613 | 6/1989 | Fed. Rep. of Germany | 210/610 |

*Primary Examiner*—Thomas Wyse
*Attorney, Agent, or Firm*—Pollock, VandeSande & Priddy

[57] ABSTRACT

This invention relates to a process for biologically converting dissolved nitrates into nitrogen, for instance for the denitrification of waste waters by microorganisms with the use of a liquified gas such as $C_3$- and/or $C_4$-hydrocarbon compounds. Said liquified gas is dissolved in the water which is to be denitrified.

6 Claims, 1 Drawing Sheet

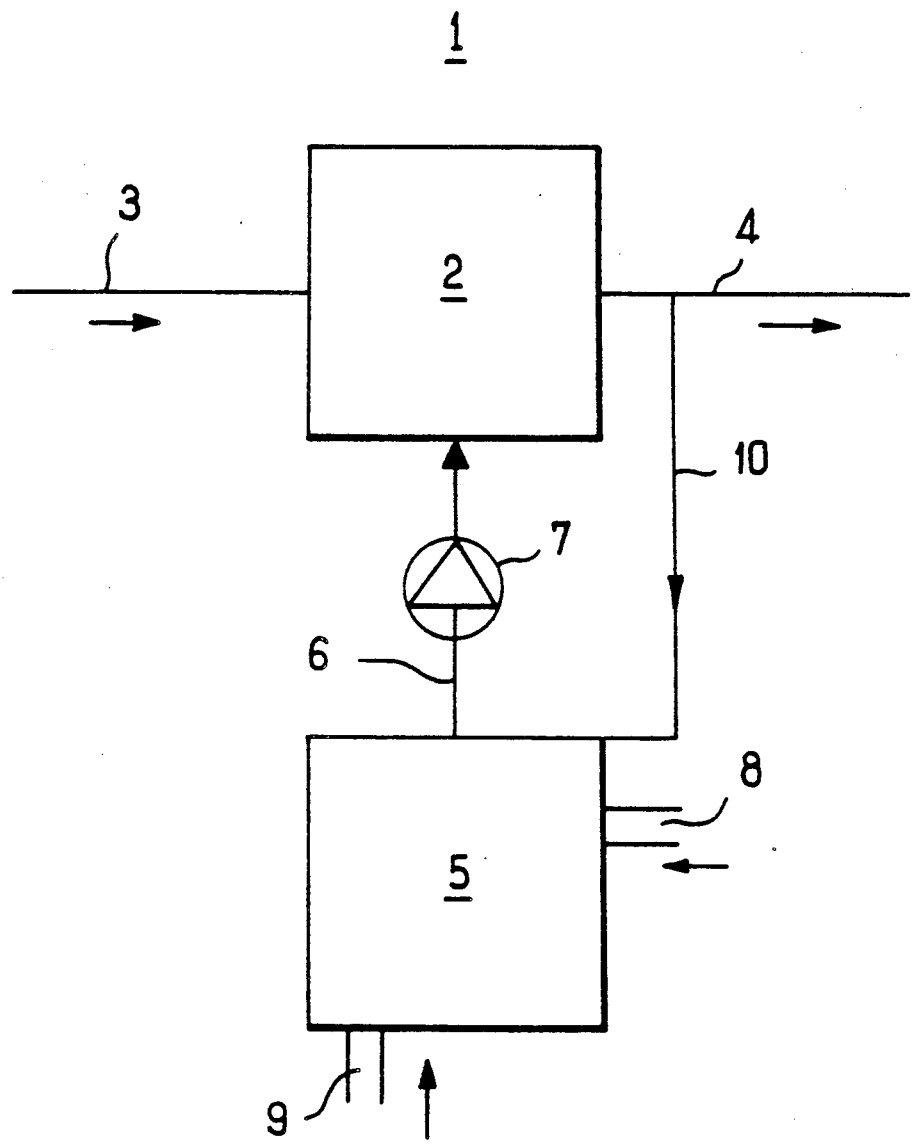

PROCESS FOR BIOLOGICAL TREATMENT OF DISSOLVED NITRATES

The invention relates to a process for biologically converting dissolved nitrates into nitrogen by means of gaseous reducing agents, and to equipment for carrying out the process.

BACKGROUND OF THE INVENTION

The removal of undesired nitrates, injurious to health, from waters by microorganisms (denitrification) with the use of gaseous reducing agents is known. At present, hydrogen and methane are used. In the case of methane, however the use was restricted to the laboratory scale.

As compared with denitrification by means of liquid reducing agents such as, for example, methanol, ethanol, organic waste products, excess sludge and the like, a gas generally has the advantage that overdosage and the consequent residual pollution need not be feared. The disadvantage of hydrogen is, however, the high operating and investment cost, since the denitrification process must be carried out under a pressure of about 5 bar gauge because of the low solubility (for example 1.7 g of $H_2/l$ at 10° C.).

Although sufficient solubility applies in the case of methane, whose suitability in principle has been proved in laboratory experiments (M. Werner, "Denitrifikation unter besonderer Berücksichtigung externer Kohlenstoffquellen" [Denitrification with special consideration of external carbon sources], publication of the Zentrum für Abfallforschung [Waste Research Centre] of Brunswick Technical University, publisher: Kayser, Albers, issue No. 3, 1988), the low, uneconomical denitrification rate proved to be a disadvantage. According to present knowledge, the limiting step of the two-stage reaction is the conversion of the methane into methanol by means of oxygen in the first step. The use of methane has therefore so far been restricted to the laboratory scale.

SUMMARY OF THE INVENTION

It is the object of the invention to develop a process and equipment of the type described at the outset in such a way that the denitrification of waters can be carried out with the minimum use of energy and plant investment, without residual pollution remaining in the water.

Consequently, the invention relates to a process for biologically converting dissolved nitrates into nitrogen by means of gaseous reducing agents, wherein a liquified gas is used as source of carbon and energy for the microbiological process. The invention is explained in more detail below.

BRIEF DESCRIPTION OF THE DRAWING

The FIGURE is a block diagram showing an arrangement of apparatus for carrying out the present invention.

DETAILED DESCRIPTION OF THE INVENTION

The reducing agent used is liquified gas. Liquified gas is here understood, in analogy to DIN 51622, as commercially available technical grades of the $C_3$- and $C_4$-hydrocarbons—propane, propene, butane, butene and mixtures thereof.

The use of these reducing agents, which are gaseous under atmospheric pressure, is particularly advantageous for the reason that they are extremely inexpensive, the problem of residual pollution is minimized and the biological degradation required for the denitrification takes place at a high rate.

For carrying out the process, the total required quantity of liquified gas can be dissolved in the water, which is to be denitrified, either outside the denitrification reactor or in the reactor itself. Economically and under safety aspects, it is advantageous to bring the water and the liquified gas into mutual contact in a closed reactor. The gas is then directly dispersed in the form of fine bubbles in the water, in order to achieve a high rate of dissolution. An equally advantageous procedure for dissolving the reducing agent is the use of gas-permeable membranes of silicone rubber. In this case, a closed reactor is unnecessary, so that costs can be saved due to the reduced expense on safety engineering. The overall required quantity of reducing agent can be dissolved either in the main water stream or in a part stream which is then returned to the main stream.

Investigations which have been carried out showed maximum conversion rates of 11.7 g of $NO_3$—N/kg of total solids. This value exceeds the values found with methane by a factor of more than 5. At the same time, it was found that oxygen is also required and that the denitrification rate is also higher, the more oxygen is fed to the denitrification reactor per unit time. Evidently, the dissolved liquified gas, which likewise cannot be utilized directly as such by the denitrifying microorganisms, must first be converted by other microorganisms into utilizable metabolic products with consumption of oxygen. The denitrificants, which are in this case associated with the microorganisms oxidizing the liquified gas, require the metabolic products, released into the water phase, as a carbon source for the conversion of the nitrate into nitrogen.

Allowing for these microbiological processes, the process is further developed in such a way that the conversion of the liquified gas into the form suitable for the denitrification takes place in a separate reactor with addition of oxygen by means of suspended or immobilized microorganisms which have spontaneously developed after a certain time. The water phase, in which the liquified gas degradation products suitable for the denitrification are enriched, is then fed to the denitrification reactors at the rate required at the time. This process engineering separation enhances the economics by altogether higher reaction rates, since each of the two process steps can be optimized independently of the other. This novel solution of the denitrification can also be used in an advantageous manner in the known processes for denitrification with methane.

The arrangement of such equipment 1 for denitrification is diagrammatically shown in the drawing. Nitrate-containing water is fed to a denitrification reactor 2 via a feeder 3. The purified water is discharged via the discharge 4. Parallel to the denitrification reactor 2, a further reactor 5 is arranged which is connected to the denitrification reactor 2 by means of a line 6 with pumps 7. Liquified gas such as, for example, methane, is fed to the reactor 5 via a line 8, and pure oxygen or atmospheric oxygen is fed via a line 9. The conversion of the liquified gas into a form suitable for denitrification in the denitrification reactor 2 takes places in the reactor 5. These degradation products of the liquified gas are then, in solution in water, fed via the line 6 to the denitrification reactor 2. To obtain the water level in the reactor 5, the latter is connected by means of a line 10 to the discharge 4, from which purified water leaving the denitrification reactor 2 passes into the reactor 5.

The processes described are particularly suitable for the denitrification of both mechanically-biologically purified effluent, process water from the beverages industry, aquaculture and the like and for the denitrification of ground water which is to be used as potable water.

The use of liquified gas leads here to more efficient and more economical conversion of nitrates into nitrogen, and, in particular, the problem of residual pollution in the event of breakdowns is minimized.

I claim:

1. A process for biologically converting dissolved nitrates into nitrogen by means of gaseous reducing agents, wherein a liquified gas which contains $C_3$-hydrocarbon compounds and/or $C_4$-hydrocarbon compounds is used in the presence of oxygen as a source of carbon and energy for the process.

2. A process according to claim 1, wherein said liquified gas is dispersed in water through silicone membranes.

3. A process according to claim 2, wherein said gas is directly dispersed in water in the form of fine bubbles for dissolution therein.

4. A process according to claim 1, wherein the nitrates are converted into nitrogen by means of suspended microorganisms in a stirred vessel.

5. A process according to claim 1, wherein the nitrates are converted into nitrogen by means of microorganisms which have grown on a carrier metal.

6. A process according to claim 1, wherein said liquified gas and oxygen are dissolved in a first reactor containing microorganisms for biologically oxidizing said liquified gas and the resulting water phase is then introduced into a second reactor containing microorganisms for converting the nitrates into nitrogen.

* * * * *